Figure 1:
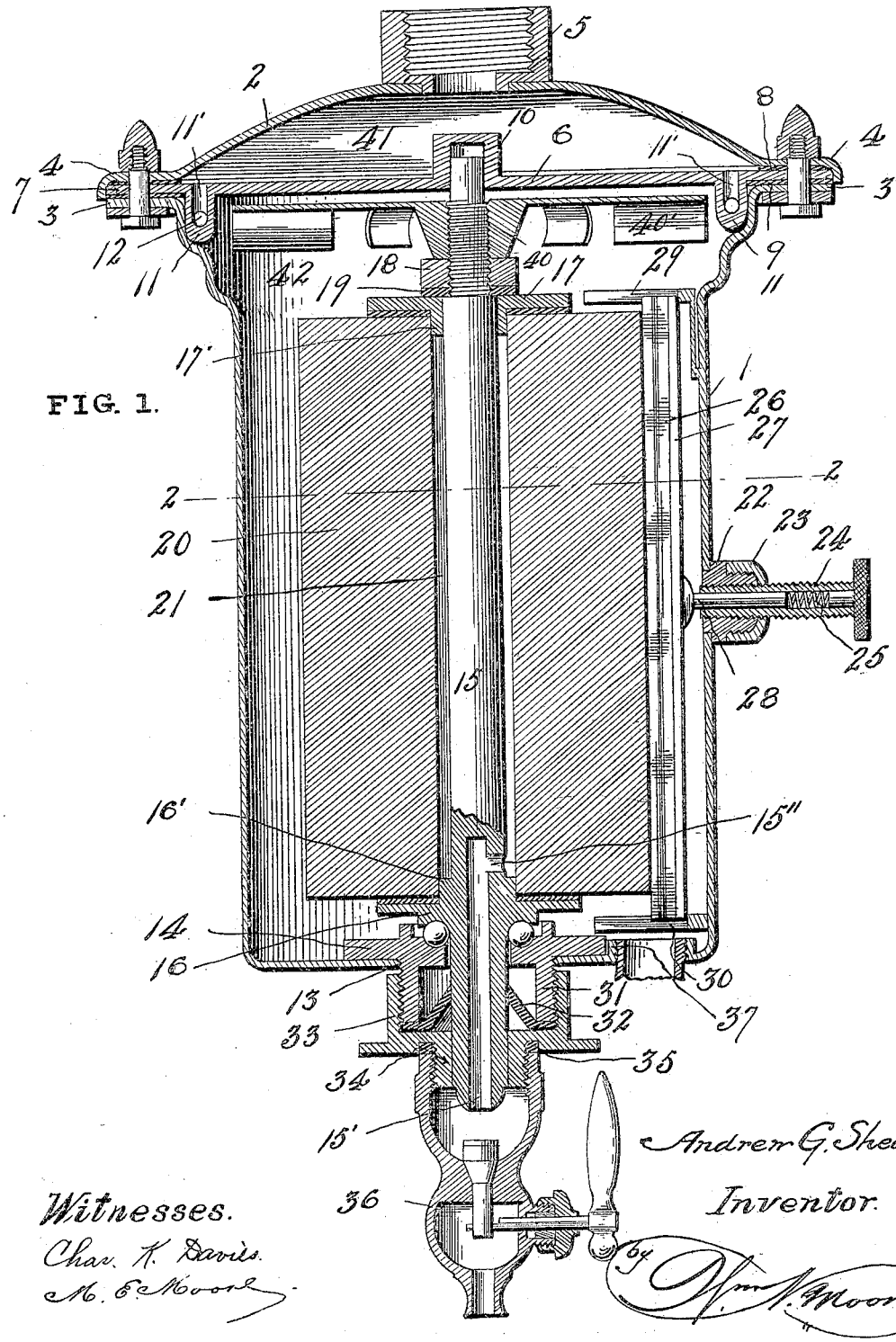

No. 821,194. PATENTED MAY 22, 1906.
A. G. SHEAK.
WATER FILTER.
APPLICATION FILED DEC. 1, 1904.
4 SHEETS—SHEET 2.
FIG. 2.
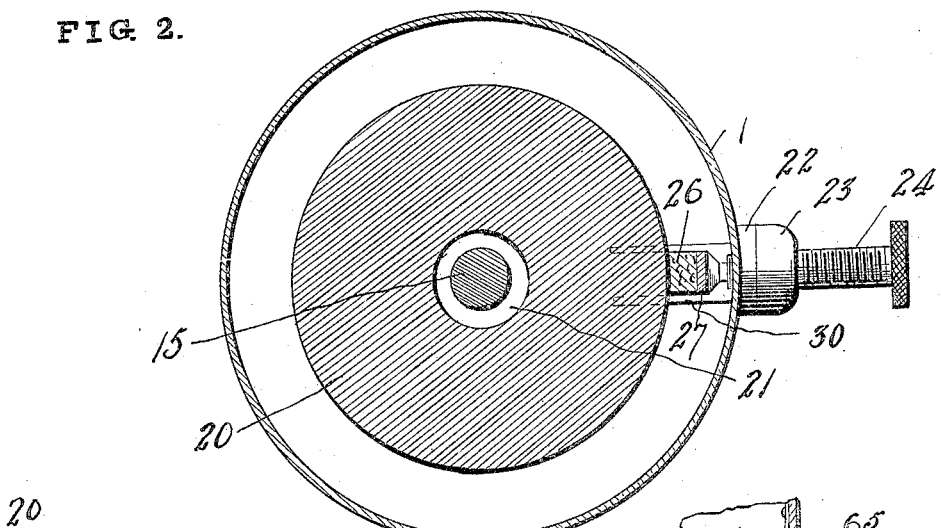
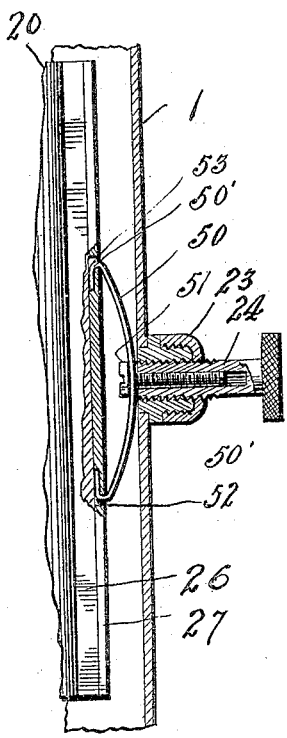
FIG. 3.
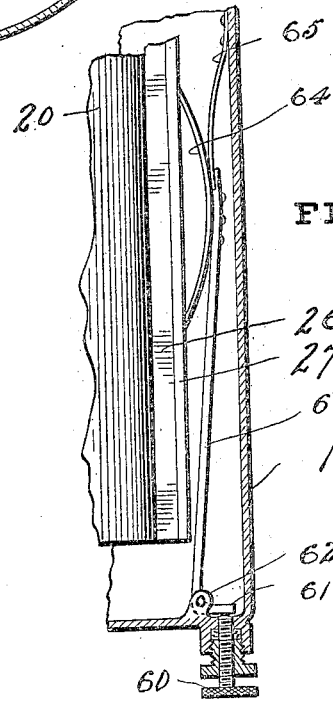
FIG. 4.
Witnesses.
Chas. K. Davis
M. E. Moore
Inventor.
Andrew G. Sheak,
by Wm. N. Moore.
Attorney No. 821,194. PATENTED MAY 22, 1906.
A. G. SHEAK.
WATER FILTER.
APPLICATION FILED DEC. 1, 1904.

4 SHEETS—SHEET 3.

No. 821,194.

PATENTED MAY 22, 1906.

A. G. SHEAK.
WATER FILTER.
APPLICATION FILED DEC. 1, 1904.

4 SHEETS—SHEET 4.

WITNESSES:
Chas. K. Davis.
M. E. Moore.

INVENTOR
Andrew G. Sheak,
BY Wm. N. Moore
Attorney

UNITED STATES PATENT OFFICE.

ANDREW G. SHEAK, OF BINGHAMTON, NEW YORK, ASSIGNOR TO THE NINETEEN HUNDRED WASHER CO.

WATER-FILTER.

No. 821,194.     Specification of Letters Patent.     Patented May 22, 1906.

Application filed December 1, 1904. Serial No. 235,024.

*To all whom it may concern:*

Be it known that I, ANDREW G. SHEAK, a citizen of the United States, residing at Binghamton, in the county of Broome and State of New York, have invented certain new and useful Improvements in Water-Filters, of which the following is a specification.

My invention relates to improvements in water-filters, and has for its objects the improvement in the construction generally of this class of devices, providing an adjustable means for cleansing the filter whereby the filtering cylinder or cylinders may be thoroughly cleaned in a simple, efficient, and easy manner and yet none of the elements of the filter as a whole be disturbed.

In some particulars my present invention is an improvement on Patent No. 652,927 granted to me and bearing date of July 3, 1900.

The invention consists in certain novel features of construction and combinations and arrangements of parts, as herein described.

In the drawings I have disclosed one example of the physical embodiment of the invention and a modification thereof wherein a plurality of filtering-cylinders are inclosed within a casing.

Figure 5:
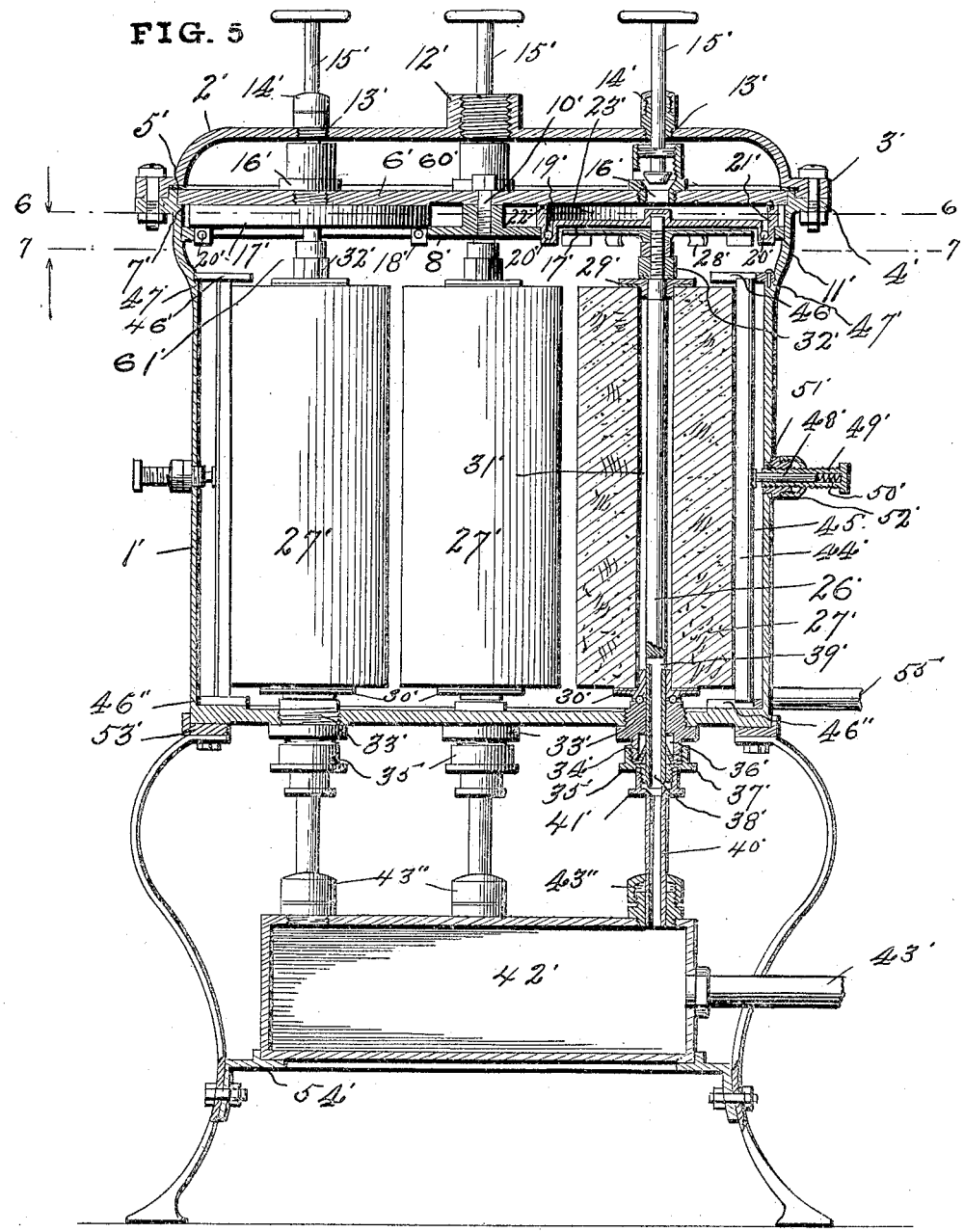
Figure 6:
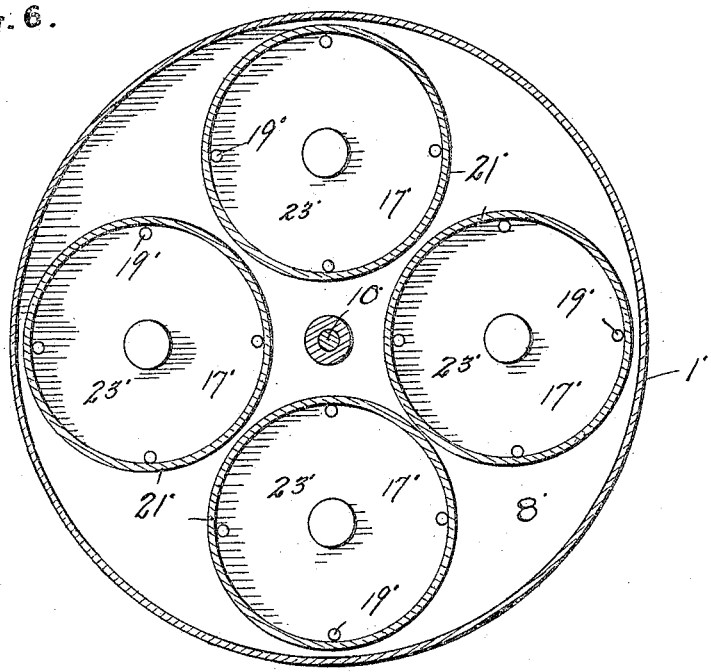
Figure 7:
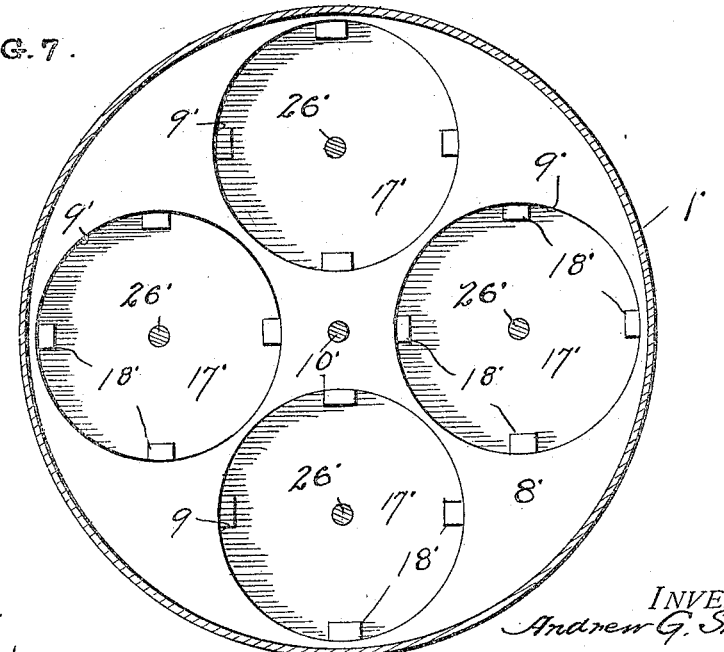

Figure 1 is a horizontal section of a filter embodying my improvements. Fig. 2 is a section on line 2 2, Fig. 1. Fig. 3 is a broken detail view of a modified form of cleaner, showing part of casing in section. Fig. 4 is a further modification of the cleaner. Fig. 5 is a central vertical sectional view of a filter comprised of a plurality of cylinders. Fig. 6 is a view on line 6 6, Fig. 5; and Fig. 7 is a view on line 7 7, Fig. 5.

In the drawings the numeral 1 indicates the casing having the top 2, each provided with a flange, as 3 and 4, and fastened by bolts. Top 2 has a threaded boss for the supply-pipe. In the upper part of the casing is a disk 6 with a flange 7, which when the parts are assembled is interposed between flanges 3 and 4. Packing-rings 8 and 9 prevent escape of water and make an absolutely water-tight joint at the connection.

The disk 6 is provided at its center with a boss 10, on the under side of which is a bearing, and disposed near the outer edge of the disk are lugs 11, preferably four in number, although the number of such lugs is not essential. These lugs are located just inside the casing 1 and are provided with perpendicular holes or orifices 11', which are intersected by horizontal passages or openings 12 in said lugs.

In the lower end of the filter-casing in its center is an opening 13, in which is inserted a ball-bearing base or collar 14. This base or collar has an extension passing through the bottom of the filter and provided with outer screw-threads. The spindle 15 is located in the vertical center of the casing. To the lower part of the spindle is securely fastened a flange 16, and on the upper part of the spindle is located a flange 17, which latter flange slips over the top of the spindle. The upper part of the spindle is threaded, except at its extreme upper end, which is made smooth and adapted to fit in the bearing-lug 10 in the disk 6. A nut 18 is also provided for the upper part of the spindle, and a packing-ring 19 is located between said nut and the upper flange 17. In the lower end of the spindle 15 is located a bore or passage 15', which extends just above the shoulder 16' of the lower flange 16, and said passage is intersected by one or more horizontal openings 15', leading to the bore 21 of the filtering-cylinder 20.

The porous cylinder 20 (preferably of tripoli) is provided with the central bore 21 and is mounted on the spindle 15. The upper and lower flanges 16 and 17 are provided with shoulders 16' and 17', respectively, and the bore 21 exactly fits over said shoulders. The filtering-cylinder 20 is firmly held in position by screwing down upon the upper flange 17 by means of nut 18. The under side of the lower flange 16 rests upon ball-bearings, as illustrated in the lower part of the filter-casing. The upper end of the spindle is held in position by the bearing-in lug 10 in the circular disk 6.

On one side of the casing 1 is provided a boss 22, which is provided with a stuffing-box 23. The inside of this boss is threaded, and a set-screw 24 is passed or screwed through the boss and projects on the inside of the casing 1. The set-screw 24 is bored out to permit the insertion of a small coil-spring 25. The means for cleaning the filtering-cylinder consists, preferably, of emery or carborundum bricks, as 26, suitably held in place by the metallic backing or piece 27. Attached to the metal back is a pin 28, which is inserted in the set-screw 24 and bears against the coil-spring 25, having free movement inside said screw.

On the inside of the casing 1 and projecting diametrically from one wall thereof are two guideways, as the upper guide 29 and lower guide 30. The cleanser is suspended by the pin 28 in screw 24 and held and guided in ways 29 and 30.

The ball-bearing collar or base 14 is provided with an inverted-cup extension 31, and a hydraulic leather valve 32, made exactly to fit the lower part of the spindle 20, is inserted in said cup around the spindle and is firmly held in position by nut 33. The lower part of said nut is provided with a threaded extension 34, grooved for a packing-ring 35. On this threaded extension is provided a faucet 36 of usual construction.

A waste-pipe may be connected to the inlet 37 at the bottom of the filter-casing for drawing off the water and for use in cleaning the filter.

As will be seen from Fig. 1, the filter contains an upper chamber 41 and a lower chamber 42, these chambers being in communication through the passages and openings 11' and 12 in the lugs of the disk 6. Thus the water under pressure passes through the connection at lug 5, through chamber 41, and from chamber 41 to chamber 42 through said passages and openings in the lugs of the disk 6. While still under pressure in chamber 42 the water passes through the filtering-cylinder 20 to the bore or chamber 21, thence through opening 15'', passage 15', to the faucet, where it may be drawn off for use. The unfiltered water is prevented from passing down around the lower part of the spindle into the faucet or out of nut 33 by the leather packing 32, which when the pressure is on in the filter is forced to close down tightly around the spindle, thus preventing the passage of water through extension 31. When the pressure is removed in chamber 42 of the cylinder, as by turning off the supply, and the water being free to escape through waste-pipe connection at 37, the packing 32 is loosened, which permits the spindle to revolve freely inside of the valve.

Assuming the waste-pipe connected at 37 to be opened, the water in the lower part of the filter drops away from the top of the lower chamber 42 and leaves the motor 40 perfectly free, so that the water which has been turned on from the supply in passing through the openings 11' and 12 of the disk 6 strikes into the cups 40' of the motor, there revolving the spindle to which the water-motor is connected and with it the filtering-cylinder in a rapid manner. The cleaner is held in position against the filtering stone or cylinder and may be adjusted to any degree of pressure within limits by the set-screw 24. Thus while the filtering-cylinder is revolving the cleaner is pressed against it hard enough to remove all accumulations, which are immediately carried away by the passage of water through the filtering-casing 1 and out through the outlet 37. The cleaner is prevented from turning sidewise by means of the pin 28 and is held against movement to either by the guide-grooves 29 and 30.

A modified means for regulating the cleaner is illustrated in Fig. 3 An elliptical spring 50, attached to the end of the hollow threaded set-screw 24, is held against said screw by a smaller screw 51, located in said screw 24. The metal back of the cleanser is provided with two openings or slots 52 and 53, in which are located the hooked ends 50' of the spring, and the cleanser is thus suspended from the elliptical spring 50 and supported thereby through the screws 24 and 51.

A further means for regulating the cleanser is illustrated in Fig. 4. This means is regulated by the set-screw 60, located in the bottom of the filtering-casing. A lever in the shape of an L having a short arm 61 is pivoted to a hinge-piece 62, which is firmly located on the bottom of the filter-casing 1. From the upper part of the long arm 63 of this lever is a short extension carrying the elliptical spring 64, which holds the cleanser suspended in suitable manner. Another stiff spring 65 is fastened to the inside wall of the casing 1, and this spring has a tendency to force the lever-arm 63 back toward the casing. The set-screw 60 is adapted to turn up against the short arm 61 of the lever, which forces the upper arm toward the cylinder. By the combined action of the upper spring and pressure from the set-screw the long arm of the lever is held firmly in place and can be regulated so that the cleanser will just touch the edge of the filtering-cylinder and is always held in proper position when adjusted.

Referring to the modified form of filter shown in Figs. 5, 6, and 7, the filter is provided with a filtering-casing 1' and a top or cover 2', which are securely fastened together by bolts passed through flange 3' on the filter-cover and annular rim or flange 4' on the filter-casing. Between the flange of the cover and the rim of the casing is a packing-ring 5' to provide against leakage. A disk 6', the upper surface of which is flush with the lower casing, is inserted in the upper portion of the filter-casing proper and rests on an annular ring or separate lugs 7' in the casing. Underneath this disk is located a plate 8', provided with four circular openings 9' therein. These openings are all equally distant from the center of the disk and equally distanced from each other. Plate 8' is secured to disk 6' by a bolt 10', and said plate rests on annular rim or separate lugs 11' in the casing 1'.

The top or cover of the filter is provided with a boss 12' with screw-threads for the connection of the inlet-pipe from a suitable source of supply. Four openings are provided in the cover, as 13', all equidistant from the center and from each other, in which are inserted the stuffing-boxes 14'. In the disk 6', directly under said openings and stuffing-boxes, are located the valve-seats 15' for valves 16', the stems of which valves pass through the stuffing-boxes in the cover, and by means of packing in the cover stuffing-boxes leakage is prevented.

In the four openings 9' in plate 8' are inserted circular metal plates 17', each provided with a boss 18ª in its center, on the under side of which boss is formed a bearing. Disposed near the edge of said plates 17' and on their under side are located the lugs 18', preferably four to each plate, each having perpendicular holes 19' bored from the upper side, which holes are intersected with horizontal passages or openings 20'. These holes and passages provide the only communication between the two sides of the disk 6'. An upright annular flange 21' extends from the upper side of each disk or plate 17', and in the top of this flange is provided a groove in which is inserted a packing-ring 22'. The disk 6' rests on these packing-rings and prevents escape of unfiltered water to the filtering-chamber. The screw or bolt 10' in the center firmly holds the upper disk 6' and the lower disk or plate 8' together and is so provided that when the top is firmly screwed down the upper disk presses against the packing-rings so that there are four water-tight chambers 23', with the exception of the openings in lugs 18'.

Below each disk or plate 17' a water-wheel 28' is located on the spindle. The filtering-cylinders 27' are held on their respective spindles by upper and lower flanged collars 29' and 30', which are located at the ends of the bore 31' of the filtering-cylinders, the upper flanged collar being secured by a nut 32', and the lower collar having a ball-bearing 33' which is screwed up into the bottom of the filtering-casing. The base is provided with a screw-threaded extension 34', in which the nut 35' is located, the extension and nut forming a chamber 36', in which a packing 37' is placed and surrounds the spindle to prevent escape of unfiltered water from the body of the casing.

The spindle is provided with a passage 38', which communicates with the bore 31' of the cylinder 27' through openings 39', and passage 38' extends to the lower end of the spindle, as shown.

A pipe 40', having a screw-threaded extension 41', is connected to the nut 34' and forms a continuation of the passage 38' of the spindle to the receiving tank or reservoir 42', from which leads the outlet-pipe 43'. Stuffing-boxes 43'' may be provided to make a water-tight joint between pipes 40' and tank 42'.

Each of the cylinders is provided with a cleaner consisting of the carborundum brick 44' and the metallic backing 45', which are located in the upper and lower grooved guide-blocks 46' and 46''. The guide-blocks 46' are secured each to a lug 47' in the casing, and the blocks 46'' are secured to the bottom of the casing, as usual.

The rod or stem 48' is attached to the metallic back 45' and is inserted with a sliding bearing in the hollow screw 49', being pressed outwardly therefrom by the spring 50'. The screw 49' is attached to the casing by a boss 51' and stuffing-box 52, as usual.

The body of the filter rests on a frame 53', attached to four legs, and the tank 42' is held in position by means of a ring 54', which is connected to these legs.

The valves 15' in the upper part of the filter are provided for the purpose of forcing all the water through the openings in one disk 17' at one time in order to insure sufficient water for revolving the cylinders through the water-wheels 28'. If there is sufficient water-pressure, all the cylinders can be revolved simultaneously; but in case of a low pressure it would be necessary to close one or more of the valves to insure sufficient pressure for revolving the desired cylinders when it is necessary to clean them.

In the side of the lower part of the casing is an opening to which is attached a waste-pipe 55'.

In operation water under pressure enters chamber 60' through the inlet 12' and passes through the valve-seats 16' into the chambers 23', where escape is prevented except through the passages in lugs 18'. The water passes through said lugs into the lower chamber 61', thence through the cylinders 27' to the bores 31' and out through the passage 38' in the spindle to the water-pipe 40' to the reservoir or tank 42'.

To clean the cylinders, if the water-pressure is great enough all the valves 15' and the pipe 55' are opened. Water passes through the lugs 18', strikes the water-wheel 28' of each spindle, and the water-wheels are revolved, carrying with them the filtering-cylinders. If the pressure is low, one or more of the valves 15' may be closed and the pressure concentrated at any desired point or points. Each cleaner 44' is pressed against its respective cylinder by adjustable screw 49', and the friction between the revolving cylinder and the stationary cleaner causes the removal of any accumulations on the cylinder, which will be carried away by the flow of water through waste-pipe 55'.

In describing the modified form of my invention I have referred to the device as a "four-cylinder" filter; but the number of cylinders may be varied and any suitable number be employed, if desired. The casing instead of being cylindrical may be oblong or square, and other changes may be made within the scope of my claims without departing from the spirit of the invention.

Having thus fully described my invention, what I claim as new, and desire to secure by Letters Patent, is—

1. The combination with a casing having an annular flange, of a cover having a complementary flange, a disk in the casing having a flange interposed between said flanges, a rotary filter having a bearing in said disk, a cleansing device adapted to bear against said filter, a hollow set-screw in the casing, a pin attached to said cleanser and located in said screw, and a spring in the set-screw bearing against said pin.

2. The combination with a filter-casing and a rotary filter therein of a cleanser adapted to bear against said filter, a set-screw connected to the casing, a pin located in said set-screw connected to the cleanser, and a spring in the set-screw bearing against said pin.

3. The combination with a casing having a receiving and a filtering chamber in communication, of filters in the filtering-chamber, means for cleaning said filters, water-wheels and means whereby the water in the receiving-chamber may be concentrated on one or more of the water-wheels of the filters to cleanse the same.

4. The combination with a casing having a receiving and a filtering compartment, of a plurality of filters in said filtering-compartment and means for cleaning said filters; water-wheels and valves between said compartments whereby the water from the receiving-compartment may be imposed on one or more of the water-wheels to rotate the filters to cleanse the same.

5. The combination with a casing having a partition forming a receiving and filtering compartment, valves between said compartments, rotary filters in the filtering-compartment, means for cleansing each filter and an inlet and outlet to the filtering-chamber.

6. The combination in a filter of a receiving-chamber and a filtering-chamber in communication, filters in said filtering-chamber, supporting-lugs on the casing and a plate thereon forming a bearing for each of said filters, and inlet and outlet pipes to said filter.

7. The combination in a filter of a receiving-chamber and a filtering-chamber in communication, filters in said filtering-chamber, supporting-lugs on the casing and a plate thereon forming supporting means for a bearing for each said filter, outlets to each filter, a storage-tank, and connections from said outlets to the storage-tank.

In testimony whereof I affix my signature in presence of two witnesses.

ANDREW G. SHEAK.

Witnesses:
 DOANE CAFFERTY,
 HARRY L. BARKER.